Figure 1:
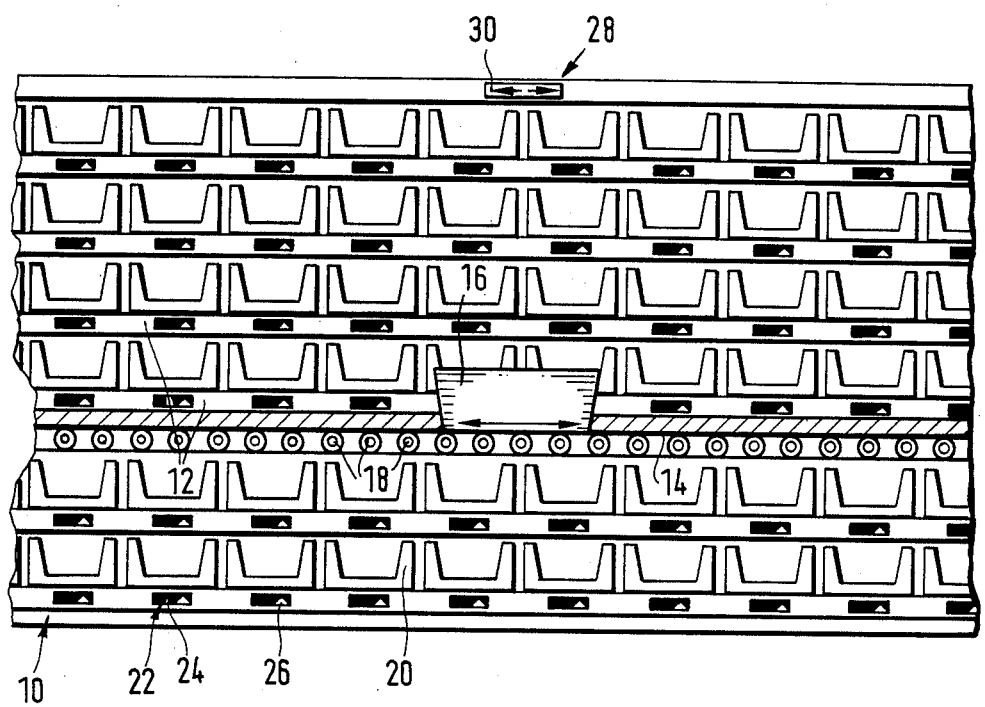

United States Patent [19]

Specht

[11] Patent Number: 4,792,273
[45] Date of Patent: Dec. 20, 1988

[54] METHOD AND APPARATUS FOR DOCUMENTLESS ORDER PICKING OF GOODS

[75] Inventor: Dieter Specht, Wermelskirchen, Fed. Rep. of Germany

[73] Assignee: Interroll Fordertechnik GmbH & Co. KG, Wermelskirchen, Fed. Rep. of Germany

[21] Appl. No.: 885,071

[22] Filed: Jul. 14, 1986

[30] Foreign Application Priority Data

Jul. 26, 1985 [DE] Fed. Rep. of Germany ....... 3526868

[51] Int. Cl.4 .............................................. B65G 1/00
[52] U.S. Cl. .................... 414/786; 414/273; 414/286
[58] Field of Search .............. 414/273, 274, 266, 267, 414/286, 280, 786; 116/202; 364/403; 340/286 M, 705, 815.31

[56] References Cited

U.S. PATENT DOCUMENTS

| | | |
|---|---|---|
| 2,961,631 | 11/1960 | Smith . |
| 3,007,599 | 11/1961 | Greasley . |
| 3,217,319 | 11/1965 | Rueger . |
| 3,246,320 | 4/1966 | Houbolt . |
| 3,495,677 | 2/1970 | Wilson .................. 414/273 X |
| 3,508,043 | 4/1970 | Dellert . |
| 3,719,941 | 3/1973 | Dickey . |
| 3,734,311 | 5/1973 | Thompson et al. ............... 414/273 |
| 3,761,920 | 9/1973 | Houbolt . |
| 3,918,052 | 11/1975 | Bricher . |
| 4,007,843 | 2/1977 | Lubbers et al. .................... 414/273 |
| 4,318,222 | 3/1982 | Frohlich .................... 340/286 M X |
| 4,367,467 | 1/1983 | Emile . |
| 4,411,577 | 10/1983 | Shearer, Jr. .................... 414/273 X |
| 4,473,870 | 9/1984 | Sorenson . |
| 4,678,390 | 7/1987 | Bonneton et al. .............. 414/286 X |
| 4,681,504 | 7/1987 | Welch, Sr. ...................... 414/273 X |

Primary Examiner—Kenneth J. Dorner
Assistant Examiner—James R. Brittain
Attorney, Agent, or Firm—Anthony J. Casella; Gerald E. Hespos

[57] ABSTRACT

In documentless order picking in which in a storage controlled via a computer the quantities of products to be removed for an order are indicated, in addition controlled via the computer the order picker is shown in which sequence he must process the order, i.e. which routes he must go, in order to minimize the total travel in picking out an order.

4 Claims, 2 Drawing Sheets

METHOD AND APPARATUS FOR DOCUMENTLESS ORDER PICKING OF GOODS

The invention relates to a method for documentless order picking, the product quantity displayed by a quantity indicator controlled by a computer being taken from product supplies and introduced into a transport container and the quantity indicated deleted via an acknowledgement key, and an apparatus for carrying out the method.

Documentless or paperless order picking is advantageous in particular in pharmaceutical wholesalers, book and gramaphone record dispatching and mail-order houses, electronic companies and deepfreeze stores, and are being increasingly used therein. The person making up an order, i.e. putting together the various ordered products so that they can be delivered to the customer, does not have any document in hand from which he can see the products and the amount of the products but instead at suitable points of the storage means controlled by a computer an indication is given as to which products and how many thereof are to be removed and placed in a collecting container. In large-area stores it may be necessary to cover long distances.

The invention is based on the problem of providing a method and an apparatus by which the distances to be covered by the order pickers are reduced.

This problem is solved according to the invention in that controlled by the computer via optical signals the order picker is shown the sequence in which the order to be made up is executed.

Apart from the indication of the container number into which the products must be inserted and the indication of the number of products which are to be removed from the supply, via suitable light signals it is indicated to the order picker in which order he must deal with the order so as to minimize the distances to be covered between the shelves. According to preferred embodiments this can be done via light signals in the form of illuminated arrows or in the form of flashing lights. For example, by flashing of a green arrow the order picker can be told whether he is to change the side of an order picking passage, i.e. whether he has to go from the one rack side to the other rack side to remove the nearest products and place them in the transport container or whether he has to continue on the same rack side in the direction indicated.

If the racks in the store are arranged in blind passages at the access to each blind passage an indication can be provided whether or not a product is to be removed from a product supply within this blind passage. The order picker is thus not compelled to enter each blind passage to check whether a certain number of a product is to be removed from a shelf disposed therein.

To enable orders to be very rapidly executed or several order pickers to be active at the same time in one section, in a further development of the invention for various order pickers apart from the quantity displays different light signals are provided for guiding the order pickers. For example, an order picker can be controlled via green light arrows and another order picker via light arrows of a different colour.

An apparatus for carrying out the method is characterized in that light signals are provided at the storage means for indicating the products to be processed next. These light signals are preferably disposed at suitable points in the storage means and are arranged at the access to blind passages to indicate to the order picker whether products are to be removed from the racks provided in this blind passage.

Figure 2:
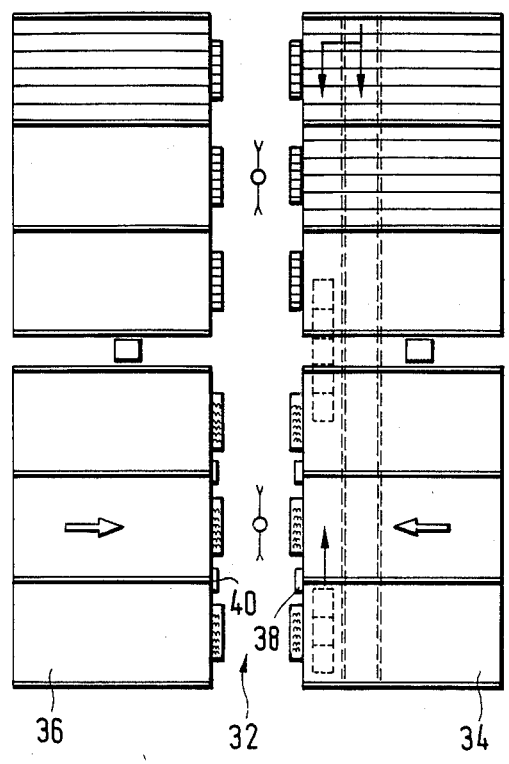
Figure 3:
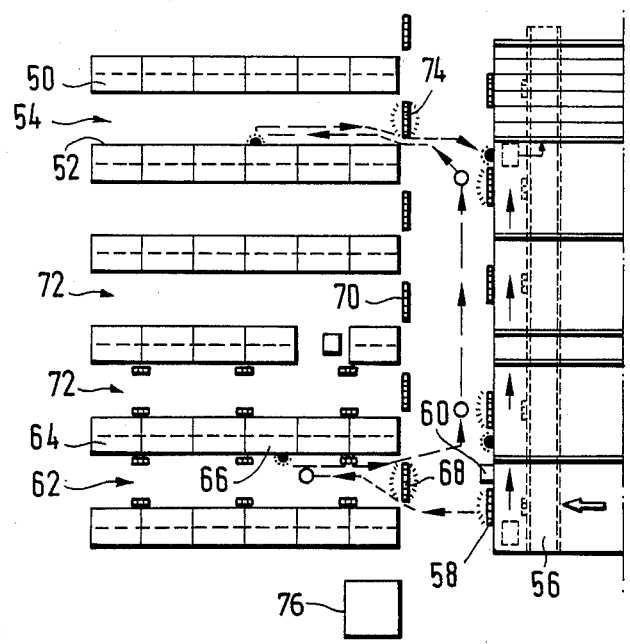

Examples of embodiment of the invention will be explained in detail hereinafter with the aid of the drawings, wherein:

FIG. 1 is a front elevation of a part of an apparatus for documentless order picking, FIG. 2 a schematic illustration of a flow store with racks on either side of an order picking passage and FIG. 3 is a mixed store with blind passages illustrated schematically.

FIG. 1 shows part of an apparatus for documentless order picking comprising a storing means 10 in the form of a rack with shelves 12 arranged above each other. In front of each rack a conveying path 14 is provided on which transport containers 16 are displaceable over rollers 18. On each of the shelves 12 product containers 20 are placed in which the products from which the orders are to be made up are stored. Beneath each container 20 on the front edge of the shelves 12 a quantity display 22 is disposed. Each quantity display 22 consists of a digital luminous display 24 and a switch 26 with which an acknowledgement is made when the product amount indicated by the luminous display 24 has been taken from a container 20 and transferred to the transport container 16. After actuation of the switch 26 the luminous display 24 is extinguished and in a processing unit connected to the quantity displays 22 it is registered that the items of the order have been selected and at the same time the products taken from the container 20 are deducted from the product amounts previously contained in the container 20 so that the products still contained in the storage means 10 can be called up at any time.

To support the order picker to minimize the distances to be covered for processing the order, at suitable points of the rack system indicators 28 are provided on which for example via illuminated green arrows 30 it is shown in which direction the order picker must go to take the necessary amount of products from a next container from the rack and transfer this amount to the transport container 16. If, as indicated in FIG. 2, on either side of an order picking passage 32 shelf systems 34 and 36 are arranged then at the end side of each rack system 34 and 36 indicators 38 and 40 respectively are provided via which the order picker is informed whether he must change from one side of the order picking passage to the other in order to cover the shortest possible distance in removing the next products or whether he must continue or go back on the same side of the passage to deal with the next items of the order. The indicators 38 and 40 may be in the form of arrows which for indicating a change of side are directed for example downwardly and in the form of arrows in the horizontal direction for indicating continuation or return. It is also possible to make these luminous displays in the form of flashing lights.

FIG. 3 shows a store in which racks 50, 52 are arranged in blind passages. If the order picker starts removing products indicated via the display 58 from a rack 56 he is informed via an indicator 60 that he must go into a blind passage 62 to remove goods from a rack 64 of a rack section 66. Via an indicator 68 the order picker is informed that he must enter the blind passage 62. Corresponding indicators 70 in front of blind passages 72 are on the other hand not activated so that the order picker knows that he need not enter this blind passage. Only when the indicator 74 in front of the blind passage 54 comes on does the order picker know that he must take a product from the rack 52. The actuation of the indicators is controlled by the computer 76 which is operative to minimize the distance to be covered by the order picker.

If several order pickers are to operate simultaneously on one or different orders in the store section, via light indicators of various colours the individual order picker can be informed in which sequence he must deal with part or the entire order. With the aid of the directed control the distances to be covered by the order pickers can be reduced which firstly contributes to increasing the rate of order picking and secondly relieves the order pickers themselves.

I claim:

1. A method for manual documentless selection of a plurality of different types of store room items for filling an order of said items by an order picker, said store room comprising a plurality of storage passages and each storage passage having a plurality of storage locations, each said storage location being for storing a plurality of predetermined type of said items, and being provided with a selectively variable optical quantity display signal and a manually actuateable acknowledgement switch for signaling selection of said items from the corresponding storage location, said method comprising for each type of store room item in said order, the steps of:

generating a first optical location signal indicating a passage for selection of at least one item in said order;

generating a second optical location signal indicating a storage location in said passage for selection of said at least one item in said order;

actuating the optical quantity display signal at the indicated storage location indicating the quantity of items to be selected therefrom;

actuating the acknowledgement switch at said indicated storage location for signaling selection of the indicated quantity of items therefrom;

extinguishing the quantity signal after actuation of said acknowledgement switch at the storage location;

generating a direction signal for directing the order picker along a minimum distance route to to the storage location for the next item required for said order.

2. A method as in claim 1 wherein said passage comprises storage locations on each side thereof, and wherein said step of generating a direction signal comprises the step of generating a signal for indicating the side of the passage at which the storage location for the next item required for said order is disposed.

3. A method as in claim 1 wherein said store room comprises a computer operatively connected to each said quantity display and to each said acknowledgement switch, said computer being operative to develop a route for minimizing distances traveled in said store room during the selection of items for said order, and wherein said method comprises as its first step developing with said computer a route to be traveled in said store room during the selection of items for an order.

4. A method as in claim 1 for manual documentless selection of a plurality of store room items for filling a plurality of separate orders by a plurality of separate order pickers wherein said method steps of generating the optical location signal and generating the direction signal comprise generating signals unique to each of said order pickers.

* * * * *